Patented Dec. 12, 1933

1,938,902

UNITED STATES PATENT OFFICE 1,938,902

SUBSTITUTED ANILIDE OF 2.3-HYDROXY-NAPHTHOIC ACID

Ernest F. Grether and Lindley E. Mills, Midland, Mich., assignors to The Dow Chemical Company, Midland, Mich., a corporation of Michigan No Drawing. Application May 14, 1931
Serial No. 537,504

11 Claims. (Cl. 260—124)

This invention relates to new arylides of 2.3-hydroxy-naphthoic acid useful as dyestuff intermediates, and distinguished from those hitherto known in that the arylides hereinafter mentioned are formed by condensing substituted anilines having probably the general formula;

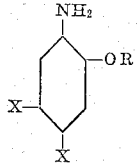

wherein X represents a halogen group and wherein R represents an alkyl, aryl, di-aryl, or aralkyl residue.

The herein described new arylides of 2.3-hydroxy-naphthoic acid are prepared by reacting said acid with various substituted anilines in the presence of phosphorus trichloride, phosphorus pentoxide or other suitable condensing agent in the usual way. Our invention, then, consists in the new arylides of 2.3-hydroxy-naphthoic acid and method of making the same hereinafter fully described and particularly pointed out in the claims.

Substituted anilines from which the arylides hereinafter utilized were made, were themselves prepared in the following way:—

Para-dichlorobenzene was chlorinated to obtain trichlorobenzene and the latter nitrated, either with concentrated nitric acid or with a mixture of nitric and sulfuric acids, to the corresponding trichloro-mononitro-benzene of melting point 57° C., and having probably the formula;

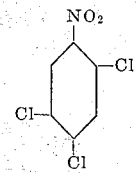

Mono-methoxy-dichloro-nitrobenzene, having a melting point of approximately 74° C. and having probably the formula;

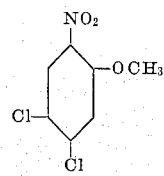

was prepared by reacting a well stirred mixture consisting of 22.7 grams (0.1 mole) of the aforementioned trichloro-nitrobenzene, 6.5 grams (0.1 mole) of sodium hydroxide and 150 cubic centimeters of methyl alcohol at a temperature of 20°–25° C. for a period of 16 hours. The reaction mixture was then poured into 400 cubic centimeters of water, the resulting mixture filtered, and the residue recrystallized from methyl alcohol. After crystallization from methyl alcohol, the product had a melting point of 74° C. Recrystallization from the same solvent did not raise the melting point. Upon analysis, our product was found to contain practically the theoretical quantity of chlorine. The yield of crude product was practically theoretical.

Mono - ethoxy - dichloro - nitrobenzene having probably the formula;

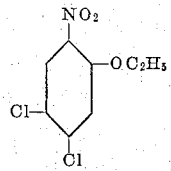

was prepared in the following way:—a solution consisting of 27 grams (0.1 mole) of trichloro-nitrobenzene and 4 grams (0.1 mole) of sodium hydroxide dissolved in 150 cubic centimeters of absolute ethyl alcohol was permitted to stand for a period of from 10 to 12 hours and at a temperature of from 25°–30° C. The reaction mixture was then poured into 400 cubic centimeters of water and the resulting mixture filtered, washed and dried. There was obtained, thereby, 23.5 grams of material melting at 50°–54° C. Recrystallization from methyl alcohol raised the melting point to 61° C. The product was analyzed and found to contain the theoretical quantity of chlorine.

Mono-phenoxy-dichloro-nitrobenzene having probably the formula;

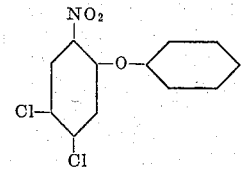

was prepared in the following way:—A solution consisting of 8.4 grams (0.2 mole) of 95 per cent pure sodium hydroxide, 10 cubic centimeters of water and 100 cubic centimeters of phenol was heated until all water was removed and the temperature of the issuing vapor was that of the boiling point of pure phenol. The flask was then cooled and 200 cubic centimeters of toluene added in order to prevent over-heating during subsequent treatment of the reaction mixture. After the addition of toluene, 45.3 grams (0.2 mole) of trichloro-nitrobenzene was added and the mixture refluxed gently for a period of 2 hours. The reaction mixture was then cooled, poured into water and the toluene layer washed with excess dilute sodium hydroxide to remove phenol and sodium chloride. The toluene was removed by heating to 100° C. in vacuo and on a water bath. There was obtained 47.4 grams of product having a melting point of approximately 74°–75° C.

Mono - orthophenylphenoxy - dichloro - nitro - benzene having probably the formula;

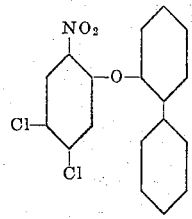

was prepared in a manner similar to that described above, except that ortho-phenyl phenol was used in place of phenol. The product obtained consisted of light yellow crystals having a melting point of approximately 120.5° C. The yield was practically 89 per cent theoretical.

The mono-alkoxy-dichloro-anilines and mono-aryloxy-dichloro-anilines used in preparing arylides from which the azo dyes hereinafter described were made, were themselves prepared by reducing the above described nitro compounds in the following way:—

In a 3 liter 3-neck flask fitted with an oil seal stirrer and reflux condenser were placed 400 grams of iron filings, 200 cubic centimeters of water, 50 cubic centimeters of ethyl alcohol and 2 cubic centimeters of glacial acetic acid. The mixture was stirred and refluxed for ½ hour, 0.25 of a gram molecular weight of the nitro compound being added in small quantities during this period. Stirring and refluxing were continued for from 4 to 16 hours, then 2 to 3 grams of sodium carbonate and 300 cubic centimeters of benzene added to the mixture. After stirring for an additional ½ hour, the benzene layer was separated, the aqueous layer filtered and the filtrate again extracted with a 300 cubic centimeter portion of benzene. The combined benzene extracts were then treated with an excess of concentrated hydrochloric acid. The hydrochloride of the amine precipitated either immediately or upon standing and was filtered from the mixture and washed with benzene. The yield was usually about 85 per cent theoretical. From the previously mentioned nitro compounds, the following amines were prepared in the manner described:—mono-methoxy-dichloro-aniline having a melting point of approximately 58° C., mono-ethoxy-dichloro-aniline, which was found to be a liquid at room temperature, mono-phenoxy-dichloro-aniline having a melting point of approximately 84° C. and mono-orthophenyl-phenoxy-dichloro-aniline having a melting point of approximately 101° C.

A preferred manner in which arylides comprising the invention may be prepared is illustrated in the specific examples given below, it being understood, however, that such examples are not to be construed as a limitation upon the invention.

*Example 1*

The mono-methoxy-dichloro-anilide of 2.3-hydroxy-naphthoic acid was prepared by heating equimolecular quantities of mono-methoxy-dichloro-aniline and 2.3-hydroxy-naphthoic acid, in the presence of about 13 per cent of their combined weight (slightly more than one-third of a molecular equivalent) of phosphorus trichloride under reflux and with stirring and in the presence of sufficient toluene to permit such stirring, for a period of from 3 to 5 hours. The reaction product was neutralized by adding an excess of sodium carbonate and the toluene removed by distilling with steam. The aqueous residue containing the arylide produced in suspension therein was filtered and the precipitate washed with water. The product was then purified by dissolving in dilute, 1 to 2 per cent, caustic alkali solution, preferably in the presence of alcohol, filtering from unreacted mono-methoxy-dichloro-aniline and precipitating by acidification of the alkaline solution. The anilide so obtained, having a melting point of approximately 213° C., is a fine powder, nearly white in color. It has probably the formula;

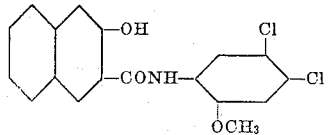

*Example 2*

The mono-ethoxy-dichloro-anilide of 2.3-hydroxy-naphthoic acid was prepared by condensing mono-ethoxy-dichloro-aniline with 2.3-hydroxy-naphthoic acid according to the method described in Example 1. The anilide so obtained, having a melting point of approximately 165° C., is a fine powder, nearly white in color. It has probably the formula;

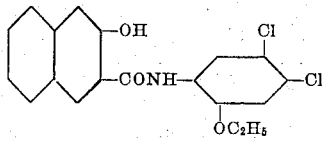

*Example 3*

By procedure similar to that described in Example 1, the mono-phenoxy-dichloro-anilide of 2.3-hydroxy-naphthoic acid was prepared by condensing mono-phenoxy-dichloro-aniline with 2.3-hydroxy-naphthoic acid. The anilide so obtained, having a melting point of approximately 212° C., is a fine powder, nearly white in color. It has probably the formula;

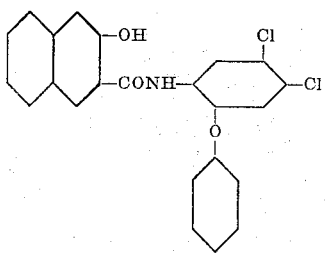

*Example 4*

In a manner similar to that described in Example 1, the mono-ortho-diphenoxy-dichloro-anilide of 2.3-hydroxy-naphthoic acid was prepared by condensing mono-orthophenyl-phenoxy-dichloro - aniline with 2.3 - hydroxy - naphthoic acid. The anilide so formed, having a melting point of approximately 165° C., is a fine powder, nearly white in color. It has probably the formula;

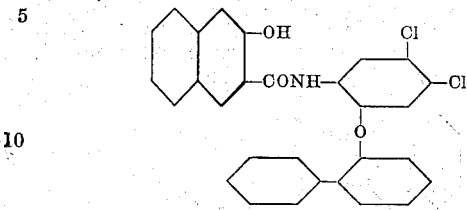

In similar manner other 2.3-hydroxy-naphthoic acid arylides of related mono-alkoxy-dichloro- and mono-aryloxy-dichloro-anilines may be prepared, such compounds being characterized by the general formula;

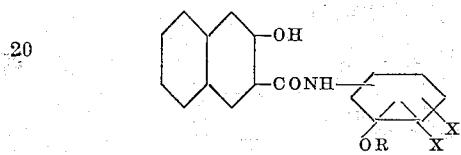

wherein X represents a halogen group and wherein R represents an alkyl, aryl, di-aryl, or aralkyl residue.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making an anilide of 2.3-hydroxy-naphthoic acid, the step which consists in condensing a substituted aniline having the general formula;

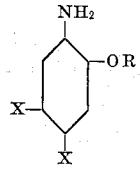

wherein X represents a halogen group and wherein R represents a radical selected from the group consisting of alkyl radicals and aryl radicals of the benzene and diphenyl series with 2.3-hydroxy-naphthoic acid in the presence of an agent capable of causing such condensation, the anilide so formed having the general formula;

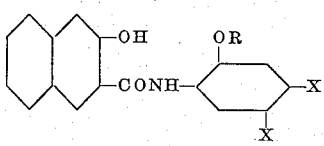

wherein X represents a halogen group and wherein R represents a radical selected from the group consisting of alkyl radicals and aryl radicals of the benzene and diphenyl series.

2. In a method of making an anilide of 2.3-hydroxy-naphthoic acid, the step which consists in condensing a substituted aniline having probably the formula;

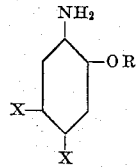

wherein X represents a halogen group and wherein R represents a radical selected from the group consisting of alkyl radicals and aryl radicals of the benzene and diphenyl series with 2.3-hydroxy-naphthoic acid in the presence of phosphorus trichloride, the anilide so formed having probably the formula;

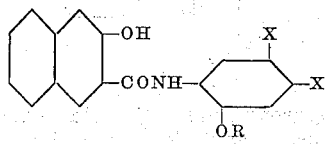

wherein X represents a halogen group and wherein R represents a radical selected from the group consisting of alkyl radicals and aryl radicals of the benzene and diphenyl series.

3. In a method of making an anilide of 2.3-hydroxy-naphthoic acid, the step which consists in condensing a substituted aniline having probably the formula;

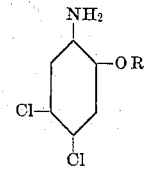

wherein R represents a radical selected from the group consisting of alky radicals and aryl radicals of the benzene and diphenyl series, with 2.3-hydroxy-naphthoic acid in the presence of phosohorus trichloride.

4. In a method of making a mono-methoxy-dichloro-anilide of 2.3-hydroxy-naphthoic acid, the step which consists in condensing mono-methoxy-dichloro-aniline having probably the formula;

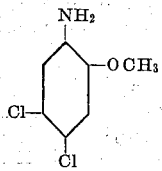

with 2.3-hydroxy-naphthoic acid in the presence of phosphorus trichloride, the anilide so formed having probably the formula;

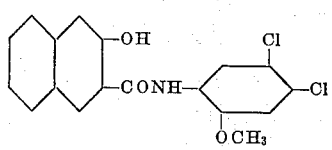

5. In a method of making a mono-ethoxy-dichloro-anilide of 2.3-hydroxy-naphthoic acid, the step which consists in condensing mono-ethoxy-dichloro-aniline having probably the formula;

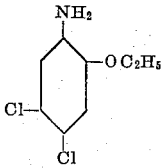

with 2.3-hydroxy-naphthoic acid in the presence of phosphorus trichloride, the anilide so formed having probably the formula;

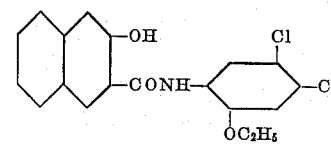

6. In a method of making a mono-phenoxy-dichloro-anilide of 2.3-hydroxy-naphthoic acid, the step which consists in condensing mono-phenoxy-dichloro-aniline having probably the formula;

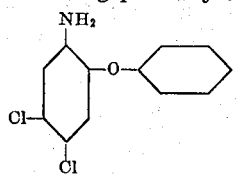

with 2.3-hydroxy-naphthoic acid in the presence of phosphorus trichloride, the anilide so formed having probably the general formula;

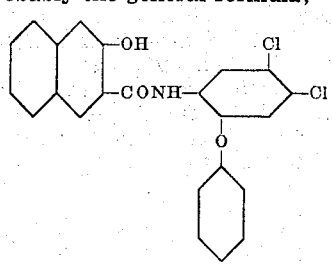

7. As a new compound, an anilide of 2.3-hydroxy-naphthoic acid having probably the general formula;

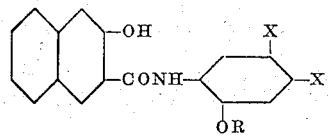

wherein X represents a halogen group and wherein R represents a radical selected from the group consisting of alkyl radicals and aryl radicals of the benzene and diphenyl series.

8. As a new compound, an anilide of 2.3-hydroxy-naphthoic acid having probably the general formula;

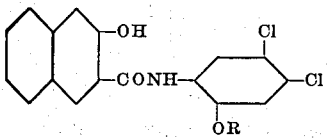

wherein R represents a radical selected from the group consisting of alkyl radicals and aryl radicals of the benzene and diphenyl series.

9. As a new compound, a mono-methoxy-dichloro-anilide of 2.3-hydroxy-naphthoic acid, having a melting point of approximately 213° C. and having probably the formula;

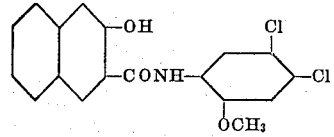

10. As a new compound, a mono-ethoxy-dichloro-anilide of 2.3-hydroxy-naphthoic acid, having a melting point of approximately 182° C. and having probably the formula;

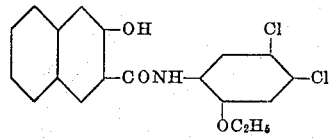

11. As a new compound, a mono-phenoxy-dichloro-anilide of 2.3-hydroxy-naphthoic acid, having a melting point of approximately 212° C. and having probably the formula;

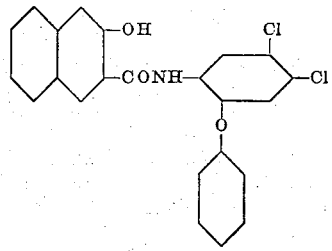

ERNEST F. GRETHER.
LINDLEY E. MILLS.